(12) United States Patent
Frantz et al.

(10) Patent No.: US 9,285,856 B2
(45) Date of Patent: Mar. 15, 2016

(54) METHOD AND SYSTEM FOR RAPID ENTRY INTO AND FOR RAPID EXITING FROM SLEEP STATES FOR PROCESSORS OF A PORTABLE COMPUTING DEVICE

(75) Inventors: Andrew J. Frantz, Boulder, CO (US); Dianne D. Horn, Boulder, CO (US); Joshua H. Stubbs, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 951 days.

(21) Appl. No.: 13/069,071

(22) Filed: Mar. 22, 2011

(65) Prior Publication Data

US 2012/0159222 A1   Jun. 21, 2012

Related U.S. Application Data

(60) Provisional application No. 61/425,677, filed on Dec. 21, 2010.

(51) Int. Cl.
*G06F 1/32* (2006.01)

(52) U.S. Cl.
CPC .................... *G06F 1/3206* (2013.01)

(58) Field of Classification Search
CPC ... G06F 1/3287; G06F 1/2206; G06F 1/2063; Y02B 60/1278
USPC .................. 713/300, 320, 323, 324
See application file for complete search history.

(56) References Cited

U.S. PATENT DOCUMENTS

| 5,461,266 | A | * | 10/1995 | Koreeda et al. ................ 307/125 |
| 5,692,197 | A | * | 11/1997 | Narad et al. .................. 713/323 |
| 5,812,860 | A | | 9/1998 | Horden et al. |
| 6,081,826 | A | | 6/2000 | Masuoka et al. |

(Continued)

FOREIGN PATENT DOCUMENTS

| CN | 101091398 A | 12/2007 |
| CN | 101414271 A | 4/2009 |

(Continued)

OTHER PUBLICATIONS

Benini L., et al., "A Survey of Design Techniques for System-Level Dynamic Power Management", Jun. 1, 2000, IEEE Transactions on Very Large Scale Integration (VLSI) Systems, IEEE Service Center, Piscataway, NJ, USA, p. 299 XP008057349, ISSN: 1063-8210 the whole document.

(Continued)

*Primary Examiner* — Michael J Brown
*Assistant Examiner* — Brandon Kinsey
(74) *Attorney, Agent, or Firm* — Nicholas A. Cole (57) ABSTRACT

A method and system for managing sleep states of a portable computing device are described. They include maintaining a sleep set of resource states and an active set of resource states in memory. A request may be issued for a processor to enter into a sleep state. This causes a controller to review a trigger set to determine if a shut down condition for the processor matches one or more conditions listed in the trigger set. Each trigger set may comprise a "trigger event" that may allow a controller to select a specific resource set which is desired by a particular processor based on a trigger event detected by a system power manager. If a trigger set matches a shut down condition, then switching states of one or more resources in accordance with the sleep set may be made by the controller without using a software handshake.

40 Claims, 6 Drawing Sheets

(56) References Cited

U.S. PATENT DOCUMENTS

| | | | |
|---|---|---|---|
| 6,098,118 | A | 8/2000 | Ellenby et al. |
| 6,405,320 | B1 | 6/2002 | Lee et al. |
| 6,535,798 | B1 | 3/2003 | Bhatia et al. |
| 6,545,999 | B1 | 4/2003 | Sugita |
| 6,823,516 | B1 | 11/2004 | Cooper |
| 6,910,036 | B1 | 6/2005 | Shee |
| 7,062,302 | B2 | 6/2006 | Yamaoka |
| 7,089,430 | B2 | 8/2006 | Cooper |
| 7,389,436 | B2 | 6/2008 | Osborn |
| 7,609,171 | B2 | 10/2009 | Haapoja et al. |
| 7,640,473 | B2 | 12/2009 | Kawasaki |
| 7,906,996 | B1 | 3/2011 | Fuks et al. |
| 7,941,682 | B2 | 5/2011 | Adams |
| 7,962,775 | B1 | 6/2011 | Vaidyu et al. |
| 8,099,731 | B2 | 1/2012 | Li et al. |
| 8,230,249 | B2 | 7/2012 | Dasgupta et al. |
| 8,271,818 | B2 | 9/2012 | Blanding |
| 8,589,932 | B2 | 11/2013 | Bower, III et al. |
| 8,618,780 | B2 | 12/2013 | Mounier et al. |
| 8,683,476 | B2 | 3/2014 | Saxe et al. |
| 8,694,817 | B2 | 4/2014 | Hoffknecht et al. |
| 8,725,488 | B2 | 5/2014 | Hofmann et al. |
| 2003/0061383 | A1 | 3/2003 | Zilka |
| 2003/0226043 | A1* | 12/2003 | Hicok ............................ 713/300 |
| 2006/0031692 | A1 | 2/2006 | Kato et al. |
| 2006/0136756 | A1* | 6/2006 | Rothman et al. .............. 713/300 |
| 2006/0146769 | A1 | 7/2006 | Patel et al. |
| 2006/0206737 | A1 | 9/2006 | Lee |
| 2007/0055795 | A1 | 3/2007 | Seo et al. |
| 2007/0232358 | A1 | 10/2007 | Sherman |
| 2007/0290727 | A1 | 12/2007 | Jarosinski et al. |
| 2008/0052543 | A1* | 2/2008 | Sokorac ......................... 713/300 |
| 2008/0091965 | A1* | 4/2008 | Nychka et al. ................. 713/323 |
| 2009/0049314 | A1 | 2/2009 | Taha et al. |
| 2009/0249103 | A1* | 10/2009 | Jeyaseelan et al. ............ 713/324 |
| 2009/0307519 | A1 | 12/2009 | Hyatt |
| 2009/0328046 | A1 | 12/2009 | Proctor et al. |
| 2010/0023732 | A1 | 1/2010 | Triplett |
| 2010/0058087 | A1 | 3/2010 | Borras et al. |
| 2010/0095143 | A1 | 4/2010 | Yamaji |
| 2010/0107166 | A1 | 4/2010 | Topaloglu |
| 2010/0115144 | A1 | 5/2010 | Dubs et al. |
| 2010/0191814 | A1 | 7/2010 | Heddes et al. |
| 2010/0191992 | A1 | 7/2010 | Shen et al. |
| 2010/0267407 | A1 | 10/2010 | Liao et al. |
| 2010/0316099 | A1 | 12/2010 | Sugita et al. |
| 2010/0332876 | A1 | 12/2010 | Fields, Jr. et al. |
| 2011/0119422 | A1 | 5/2011 | Grouzdev |
| 2011/0173470 | A1 | 7/2011 | Tran |
| 2011/0252251 | A1* | 10/2011 | de Cesare et al. ............. 713/320 |
| 2011/0307891 | A1 | 12/2011 | Orr et al. |
| 2012/0084589 | A1* | 4/2012 | Millet et al. ................... 713/323 |
| 2012/0110351 | A1 | 5/2012 | Raju et al. |
| 2012/0284729 | A1 | 11/2012 | Sharda et al. |
| 2012/0291042 | A1 | 11/2012 | Stubbs et al. |
| 2012/0291043 | A1 | 11/2012 | Stubbs et al. |
| 2013/0007492 | A1 | 1/2013 | Sokol, Jr. et al. |
| 2013/0125130 | A1 | 5/2013 | Stubbs et al. |
| 2014/0173621 | A1 | 6/2014 | Stubbs et al. |

FOREIGN PATENT DOCUMENTS

| | | | |
|---|---|---|---|
| CN | 102213998 A | | 10/2011 |
| JP | 11266254 A | | 9/1999 |
| JP | 3463555 B2 | | 11/2003 |
| JP | 2006072991 A | | 3/2006 |
| WO | WO2007115319 | | 10/2007 |

OTHER PUBLICATIONS

International Search Report and Written Opinion—PCT/US2011/065885—ISA/EPO—Apr. 25, 2012.

Li J., et al., "The Thrifty Barrier: Energy-Aware Synchronization in Shared-Memory Multiprocessors", Feb. 14, 2004, High Performance Computer Architecture, 2004. HPCA-10. Proceedings. 10th International Symposiums on Madrid, Spain Feb. 14-18, 2004, Piscataway, NJ, USA, IEEE, pp. 14-14, XP010778825, ISBN: 978-0-7695-2053-7 the whole document.

Pantazis et al., "Power control schemes in wireless sensor networks for homecare e-health applications", Proceedings of the 1st international conference on PErvasive Technologies Related to Assistive Environments Jun. 19, 2008, XP002670363, Retrieved from the Internet: URL: http://dl.acm.org/citation.cfm"id=1389683 [retrieved on Feb. 24, 2012] the whole document.

Maurer W.D., et al., "Hash Table Methods", ACM Computing Surveys, ACM, New York, NY, US, US, vol. 7, No. 1, Mar. 1, 1975, pp. 5-19, XP009022942, ISSN: 0360-0300, DOI: 10.1145/356643.356645 abstract line 1—p. 7, line 10.

* cited by examiner

| ACTIVE/SLEEP TRIGGER SETS | | | | |
|---|---|---|---|---|
| | | SLEEP | ACTIVE | TIMER |
| 316 | INTERRUPT | SHUT DOWN | BRINGUP | <TIME> |
| 318 | FROM SET | FROM ANY # | SLEEP | SLEEP |
| 320 | GOTO SET | SLEEP | TO ANY # | TO ANY # |

METHOD AND SYSTEM FOR RAPID ENTRY INTO AND FOR RAPID EXITING FROM SLEEP STATES FOR PROCESSORS OF A PORTABLE COMPUTING DEVICE

PRIORITY AND RELATED APPLICATIONS STATEMENT

This application claims priority under 35 U.S.C. §119(e) to U.S. Provisional Patent Application Ser. No. 61/425,677, filed on Dec. 21, 2010, entitled, "Method and system for rapid entry into and for rapid exiting from sleep states for processors of a portable computing device." The entire contents of this U.S. Provisional Patent Application are hereby incorporated by reference.

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

PCDs typically have complex and compact electronic packaging that is generally made of multiple processing units that include central processing units, digital signal processors, and the like. Much of this hardware may be part of a system on a chip ("SOC") design as understood by one of ordinary skill in the art.

Conventional PCD's usually experience significant lag time when respective processors of different SOCs try to enter into low power states. Low power states are also referred to as sleep states as understood by one of ordinary skill in the art.

One problem faced by conventional processors is that several communications usually take place in software in order for a processor to enter into a sleep state. This problem is further complicated by the fact that some resources are shared resources whose state needs to be coordinated between multiple SOC subsystems.

Within a given subsystem of SoC, the management of local resources is usually easy and can be done from the respective operating system's idle context. However, to manage the shutdown of a shared resources state usually has to be coordinated with the controller of that resource. Conventional solutions have worked around this shutdown complication through use of synchronous handshake in software before the subsystems are permitted to enter a sleep state. This approach is disadvantageous for several reasons: Software handshakes are slow. Software handshakes are prone to all sorts of delay; particularly interrupt service and context switch problems.

Software handshakes delay power savings. Because a handshake is in software, the instruction processing core needs to remain on until the full handshake is complete. Processor cores are large and complex, thus this is a considerable penalty in power savings to pay.

Accordingly, what is needed in the art is a method and system for allowing processors of PCDs to enter sleep states without software handshakes.

SUMMARY

A method and system for managing sleep states of a portable computing device are described. They include maintaining a sleep set of resource states and an active set of resource states in memory. The sleep set and active set may be modified based on prior usage of the portable computing device. A request may be issued for a processor to enter into a sleep state. This causes a controller to review a trigger set to determine if a shut down condition for the processor matches one or more conditions listed in the trigger set. Each trigger set may comprise a "trigger event" that may allow a controller to select a specific resource set which is desired by a particular processor based on a trigger event detected by a system power manager. If a trigger set matches a shut down condition, then switching states of one or more resources in accordance with the sleep set may be made by the controller without using a software handshake.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology, have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, and a laptop computer with a wireless connection, among others.

Figure 1:
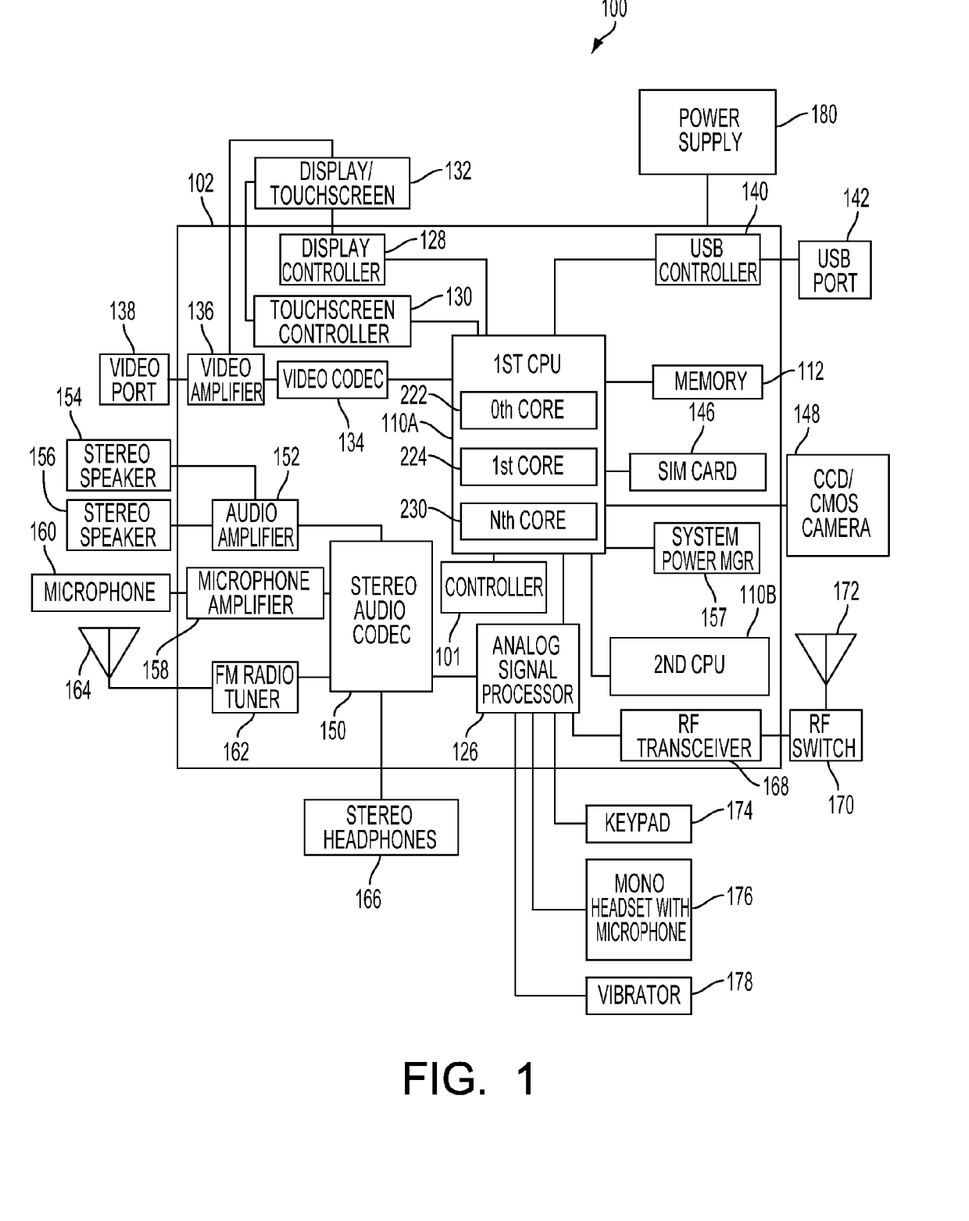
FIG. 1 is a functional block diagram illustrating an embodiment of a portable computing device (PCD)

FIG. 1: Elements of PCD 100 for Promoting Rapid Entry and Exiting of Processor Sleep States Referring to FIG. 1, this FIG. is a functional block diagram of an exemplary, non-limiting aspect of a PCD 100 in the form of a wireless telephone for implementing methods and systems for managing rapid sleep states of processors 110, 126 within the PCD 100. As shown, the PCD 100 includes an on-chip system 102 that includes a multi-core, first central processing unit ("CPU") 110A, a second CPU 110B that is a single-core type, and an analog signal processor 126.

These three processors 110A, 110B, and 126 may be coupled together. The first CPU 110A may comprise a zeroth core 222, a first core 224, and an Nth core 230 as understood by one of ordinary skill in the art. In an alternate embodiment, instead of using two CPUs 110, two digital signal processors ("DSPs") may also be employed as understood by one of ordinary skill in the art. In a further exemplary embodiment, any of the aforementioned may used in a combination as understood by one of ordinary skill in the art.

FIG. 1 includes one or more controller module(s) 101. For the remainder of this description, the controller module(s) 101 will be referred to in the singular, as a controller 101, and not plural. One of ordinary skill in the art will recognize that the controller 101 may be divided into various parts and executed by different processors 110, 126 without departing from the invention. Alternatively, the controller 101 may be organized as a single element and executed by a single processor 110 or 126.

FIG. 1 also illustrates system power manager 157. The system power manager ("SPM") 157 is coupled to the CPU 110A and the controller 101. The SPM 157 generally comprises hardware, such as a processor. However, software and/or firmware may be employed for the SPM 157 as understood by one of ordinary skill in the art. The SPM 157 may be responsible for monitoring the state of a processor 110, 126 and a power rail. The SPM 157 may detect when a processor 110, 126 is about to enter a sleep state or is about to leave a sleep state. The SPM 157 may communicate these states of a processor 110, 126 to the controller 101.

The controller 101 may comprise software which is executed by the CPUs 110. However, the controller 101 may also be formed from hardware and/or firmware as understood by one of ordinary skill in the art.

In general, the controller 101 may be responsible for promoting the rapid entry into sleep states and the rapid exiting from sleep states for the processors 110, 126. The controller 101 may include one or more tables that comprise resource sets and trigger sets as will be described in further detail below in connection with FIG. 3. The controller 101 may also have its own interrupt controller (not illustrated) for when all other hardware elements in the PCD 100 are placed in a low power state and are not functional.

The controller 101 also manages resource requests among one or more master processors 110, 126. Resource requests may be issued by a master processor 110 to request an action or function from a resource 105 (See FIG. 2).

Resources 105 may include clocks and other low-level processors that support tasks, commands, and features of software applications that are executed by one or more master processors 110, 126. The controller 101 may be designed to prevent resource request conflicts among a plurality of master processors 110, 126.

FIG. 1 shows that the PCD 100 may include memory 112. The controller 101 running on the CPUs 110 may access the memory 112 to facilitate rapid sleep states and to facilitate rapid exiting from sleep states as will be described in further detail below.

In a particular aspect, one or more of the method steps described herein may implemented by executable instructions and parameters stored in the memory 112 that form the controller 101. These instructions that form the controller 101 may be executed by the CPUs 110, the analog signal processor 126, or another processor. Further, the processors, 110, 126, the memory 112, the instructions stored therein, or a combination thereof may serve as a means for performing one or more of the method steps described herein.

FIG. 1: Other Elements of the PCD 100

As illustrated in FIG. 1, a display controller 128 and a touchscreen controller 130 are coupled to the digital signal processor 110. A touchscreen display 132 external to the on-chip system 102 is coupled to the display controller 128 and the touchscreen controller 130.

FIG. 1 is a schematic diagram illustrating an embodiment of a portable computing device (PCD) that includes a video coder/decoder ("codec") 134, e.g., a phase-alternating line ("PAL") encoder, a sequential couleur avec memoire ("SECAM") encoder, a national television system(s) committee ("NTSC") encoder or any other type of video encoder 134. The video codec 134 is coupled to the multicore central processing unit ("CPU") 110. A video amplifier 136 is coupled to the video encoder 134 and the touchscreen display 132. A video port 138 is coupled to the video amplifier 136. As depicted in FIG. 1, a universal serial bus ("USB") controller 140 is coupled to the CPU 110. Also, a USB port 142 is coupled to the USB controller 140. A subscriber identity module (SIM) card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply 180 includes a rechargeable DC battery or a DC power supply that is derived from an alternating current ("AC") to DC transformer that is connected to an AC power source.

As depicted in FIG. 1, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 102.

Figure 2:
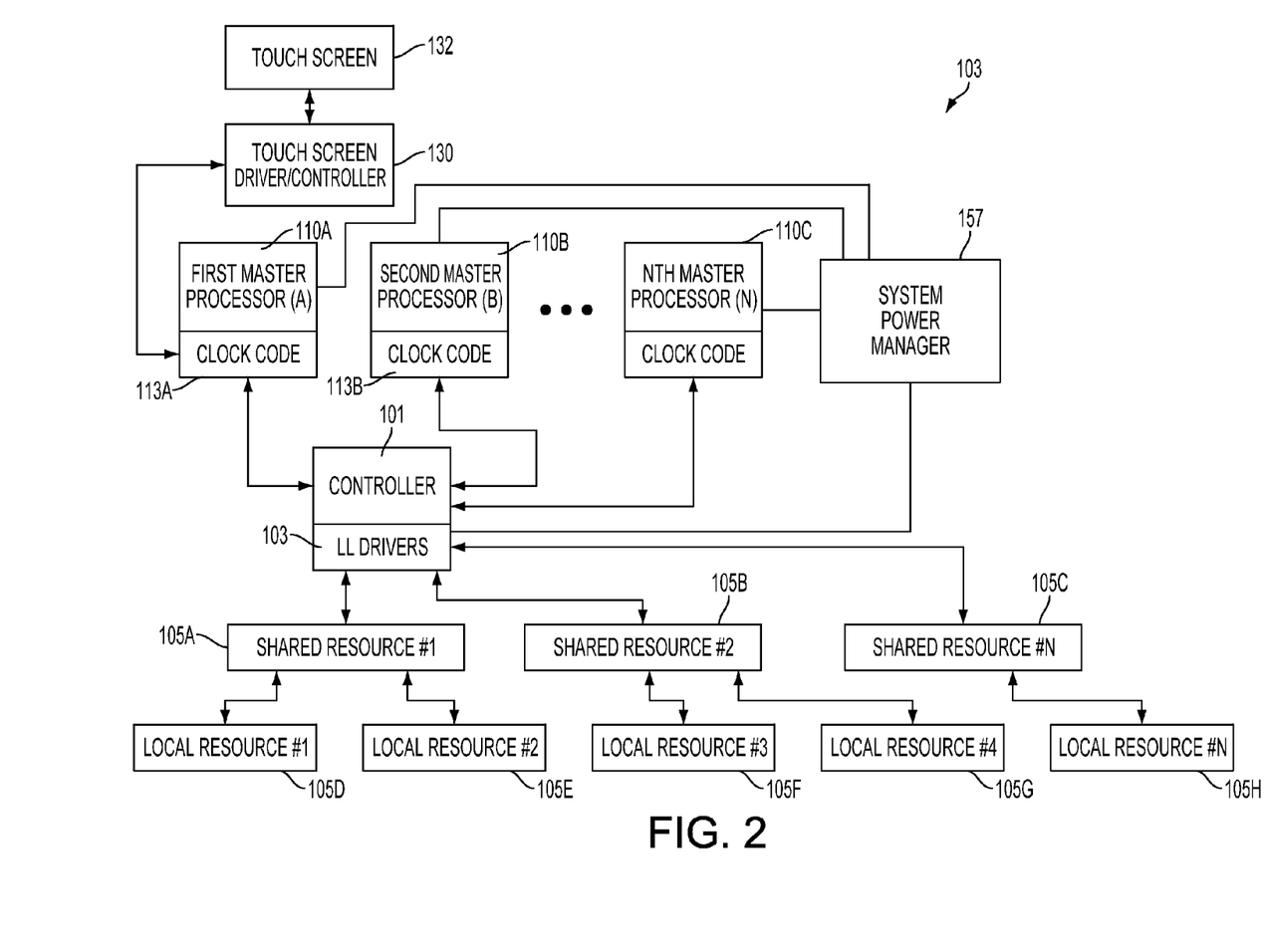
FIG. 2 is a functional block diagram illustrating relationships among a controller, a system power manager, master processors, low-level drivers, shared resources, and local resources.

FIG. 2 is a functional block diagram illustrating relationships among the controller 101, system power manager 157, master processors 110, 126, low-level drivers 103, shared resources 105A-C, and local resources 105D-H that form a system 103. The system 103 may switch among resource states desired by a processor 110 without software handshakes.

FIG. 2 also illustrates a how the touchscreen 132 may be coupled to the touchscreen driver/controller 130. The touchscreen driver/controller 130 may be coupled to clock code 113A of a first master processor 110A.

The first master processor 110A may be coupled to the system power manager 157 and the controller 101. The controller 101 may be coupled to the clock code 113A of the first master processor 110A. The controller 101 may comprise one or more low-level drivers 103. The one or more low-level drivers 103 may be responsible for communicating with one or more shared resources 105A-C. Shared resources 105A-C may comprise any type of device that supports tasks or functions of a master processor 110. Shared resources 105A-C may include devices such as clocks of other processors as well as single function elements like graphical processors, decoders, and the like.

The shared resources 105A-C may be coupled to one or more local resources 105D-H. The one or more local resources 105D-H may be similar to the shared resources 105A-C in that they may comprise any type of device that supports tasks or functions of a master processor 110. Local resources 105D-H may include devices such as clocks of other processors as well as single function elements like graphical processors, decoders, and the like. The local resources 105D-H may comprise leaf nodes. Leaf nodes are understood by one of ordinary skill in the art as local resources 105D-H that usually do not refer or include other dependent resources 105.

The controller 101 may be responsible for managing requests that are issued from the one or more master processors 110, 126. For example, the controller 101 may manage a request that originates from the first master processor 110A. The first master processor 110A may issue this request in response to an operator manipulating the touchscreen 132. The touchscreen 132 may issue signals to the touchscreen driver/controller 130. The touchscreen driver/controller 130 may in turn issue signals to the clock code 113A of the first master processor 110A.

The controller 101 may also be responsible for managing the sleep states for a particular processor 110. Prior to entering a sleep state, a processor 110 will provide information for managing sleep states. Information for managing sleep states includes the entry into and exiting from a sleep state. This information for managing sleep states will be referred to below as triggers and resource states.

Triggers may define events that cause a processor 110 to either enter into a sleep state or to leave a sleep state. Triggers will generally reference resource states that are contained within or that are accessible by the controller 101. Resource states define a desired state of resources 105 needed by particular processor 110. Each processor 110 may provide at least two sets of resource states to a controller 101: an active set of resource states and a sleep set of resource states.

The active set of resource states may define states of resources 105 for when the processor 110 is active and requiring action/functions from its resources 105. The sleep set of resource states may define states of resources 105 when the processor 110 is in a sleep or dormant state. Further details about triggers and resource states will be described below in connection with FIG. 3.

Figure 3:
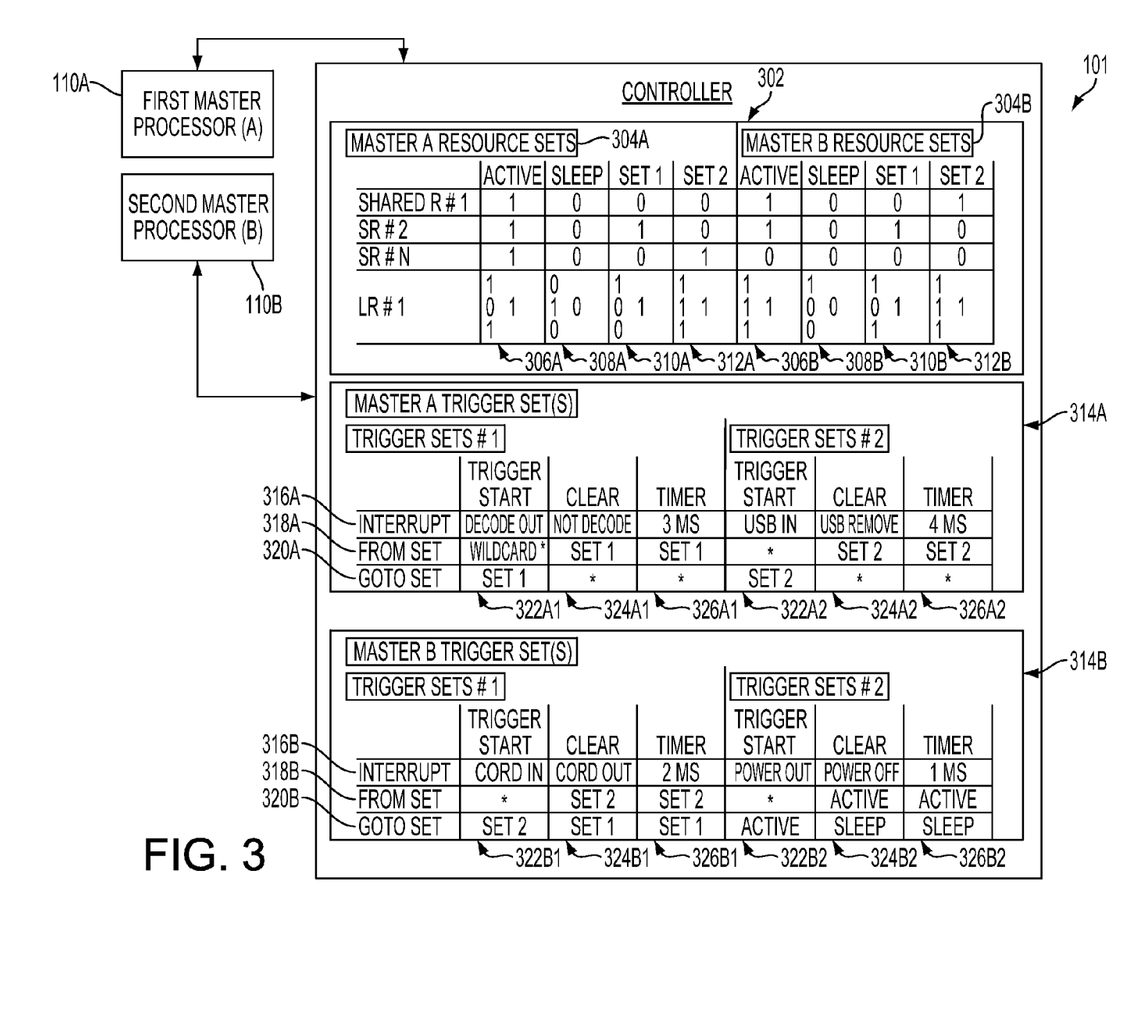
FIG. 3 is a functional block diagram illustrating details about the controller and trigger sets.

FIG. 3 is a functional block diagram illustrating details about the controller 101, resource sets 304, and trigger sets 314. As noted previously, the controller 101 may comprise software executed by one or more of the processors 110, 126 of the PCD 100. The controller 101 may store information in memory 112 or in an area within the controller 101, such as local storage as understood by one of ordinary skill in the art. This information may comprise a resource table 302 that includes resource sets 304 that are assigned to each master processor 110 which is serviced by the controller 101. This information may also comprise trigger sets 314 that are also assigned to each master processor 110 and which may be unique to each master processor 110.

Each resource set 304 generally comprises information relating to states of resources 105 desired by a particular master processor 110. Each resource set 304 assigned to a particular master processor 110 may comprise an active resource set 306, and a sleep resource set 308. The active resource set 306 may define or describe states of resources 105 when a particular master processor 110 is active or functioning normally. The sleep resource set 308 may define or describe states of resources 105 when a particular master processor is in a sleep or dormant state as understood by one of ordinary skill in the art. Each resource set 304 may also comprise additional sets such as "set 1" and "set 2" assigned to the first master processor 110 in the exemplary embodiment illustrated in FIG. 3.

As an example, the active resource set 306 for the first master processor (A) 110A as illustrated in FIG. 3 has assigned the following values for each of its resources 105: for the first shared resource (SR#1) 105A the value is one; the value for the second shared resource (SR#2) 105B is one; the value for the Nth shared resource (SR#N) 105C is one; while the four values for the first local resource (LR#1) 105D are one, zero, one, and one.

As noted previously, states of resources 105 are not limited to single values and may include a plurality of values. Further, states of resources may include any of a number of different types of parameters. For example, a state may designate hundreds of megahertz for the amount of clock speed of a particular clock that may function as a resource 105.

As another example, the sleep resource set 308A for the first master processor (A) 110A as illustrated in FIG. 3 has assigned the following values for each of its resources 105: for the first shared resource (SR#1) 105A, this resource has been assigned value of zero; the second shared resource (SR#2) 105B has an assigned value of zero; while the Nth shared resource (SR#N) 105C has an assigned value of zero. The first local resource (LR#1) 105D may have assigned values of zero, one, zero and zero.

Each trigger set 314 assigned to a particular master processor 110 may comprise at least three fields: an interrupt field 316; a "from set" 318; and a "go to set" 320. Each of these three fields of a trigger set 314 may also include a corresponding set of three columns: a trigger start column 322; a clear column 324; and a timer column 326.

The interrupt field 316 describes the action or activity that may be generated and/or detected by the system power manager 157. The interrupt field 316 may be generally characterized as the "trigger event" that may allow a controller 101 to select a specific resource set 304 which is desired by a particular processor 110 based on the trigger event detected by the SPM 157. The selection of a resource set 304 by the controller 101 may avoid the time consuming software handshake described above in the background section.

Reviewing the first trigger set (trigger set #1) of FIG. 3 for the first master processor (A) 110A, the fields of the set discussed in order by columns. Starting with the first column of the trigger set 314A, the trigger start column 322 has an action listed as "decode interrupt" in its first row corresponding to the interrupt field 316.

As noted previously, the interrupt field 316 may define parameters that cause the controller 101 to activate the states of a resource set 304 in response to the detection of the trigger start field 322. In the exemplary embodiment illustrated in FIG. 3, the interrupt field 316A has been defined or described as a "decode interrupt" which means that when the system power manager 110 detects a "decode interrupt" such as when a PCD 100 is decoding video, then this event may alert the controller 101 to review the "from set" field 318 in the first column 322A1 under the "trigger start" column.

The "from set" field 318 may comprise a value that denotes what the current resource set 304 should be for the particular master processor 110 being reviewed by the controller 101. This field 318 may list a resource set 304 by its identifier such as the "active set", the "sleep set", or a set number like "set 1" or "set 2". The field 320 may also comprise a "wild card" like an asterisk.

A wildcard designation in the "from set" field 318 may cause the controller 101 to retrieve the last known active resource set 304 that was being used by a particular master processor 110. In the exemplary embodiment illustrated in FIG. 3, the "from set" row 318A and trigger start column 322A1 have a value of an asterisk or wildcard.

The "go to set" 320, like the "from set" 318, may comprise a listing of a resource set 304 by its identifier such as the "active set", the "sleep set", or a set number like "set 1" or "set 2". The field 320 may also comprise a "wild card" like an asterisk that means the last resource set 304 being utilized by a processor 110. In the exemplary embodiment illustrated in FIG. 3, the "go to set" field 320A and the trigger start field column 322A1 has a value of "set 1" which is the resource set 1 listed in column 310A of the first resource set 304A.

For the example illustrated in FIG. 3, when a decode interrupt event is detected by the SPM 157, it alerts the controller 101. The controller 101 reviews the first trigger set for the first master processor 110. Since the trigger start column 322A1 lists a matching value (a decode interrupt), the controller 101 reviews the "from set" field 318A and determines that the value is a wildcard value or asterisk. The controller 101 then reviews the "go to" field 320A which has a value of "set 1" that designates a particular resource set 304A. Based on this information reviewed by the controller 101, the controller 101 will switch the current resource set 304A for the first master processor 110A from its current set to the resource set "set 1." Resource Set 1 is listed in column 310A of the resource set 304A assigned to the first master processor 110A.

Further, when the SPM 157 or the controller 101 detects a "not decode" event such as illustrated in the clear column 324A1 of the first trigger set, then the controller 101 will then review the "from set" field 318A and determine that this value comprises "set 1." The controller 101 will then review the "go to set" field 320 which has a value of a wildcard or an asterisk in this example. This means that the controller 101 will switch the resource set 304A of the first master processor 110A from the "set 1" resource set to the last active resource set used by the processor 110A.

The timer field 326 of the trigger set may denote an amount of time that a particular resource set 304 may be used by the controller 101. So for the exemplary embodiment illustrating FIG. 3, for the timer field 326A1 of the first trigger set, this field has a value of three milliseconds. This means that when the decode interrupt event is matched with the trigger start field 322A1 of the first trigger set, then the controller 101 utilizes the resource set 304 specified in the "go to set" field 320A for only a period of three milliseconds. In other exemplary embodiments, situations may occur or exist in which there is no information in the timer field 326 or the value is defined to correspond with a value that indicates that there is no timer trigger 326 for this transition and that the transition only applies to the no decode field. In a situation in which the timer field is defined, such as illustrated in FIG. 3—timer fields 326A1 and 326A2, then whichever event occurs first between the timer field 326 and the Clear field 324 will usually initiate the transition.

Figure 4:
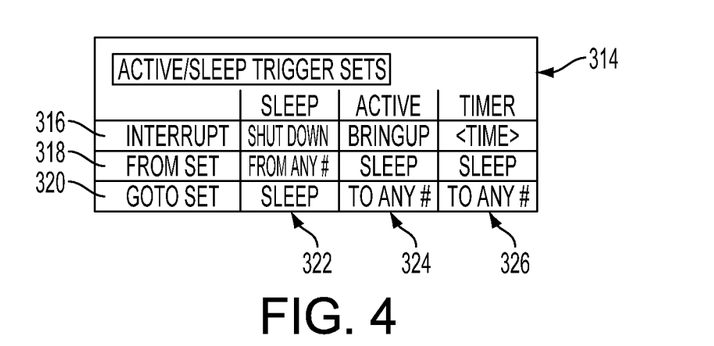
FIG. 4 illustrates an exemplary active-sleep trigger set for a processor.

FIG. 4 illustrates an exemplary active-sleep trigger set 314 for a processor 110. In this exemplary embodiment, the interrupt field 316 in the first column 322 define a "shut down" event as the action to initiate a sleep set 308 (FIG. 3) for a particular processor 110. The "shut down" event may include action like an operator selecting an on/off button for shutting down a PCD 100.

In the exemplary embodiment in FIG. 4, when a "shut down" event is detected, the controller 101 transitions the current active resource set 306 to a sleep set 308. The sleep set 308 is listed in a master resource set 304 of table 302 in FIG. 3.

When the controller 101 receives a message from the SPM 157 that a "bring up" event has occurred, such as a power-on event initiated by an operator of the PCD 100, then the controller would transition the processor 110 from its sleep set 308 to the last active resource set 304 based on the wildcard or asterisk value listed in the "go to set" field 320 of the trigger set 314.

As described above, the system 103 is not limited to active and sleep sets 306, 308. The system 103 may be used for switching between resource sets 304 for events other than entering or exiting sleep states as illustrated in FIG. 3.

Figure 5:
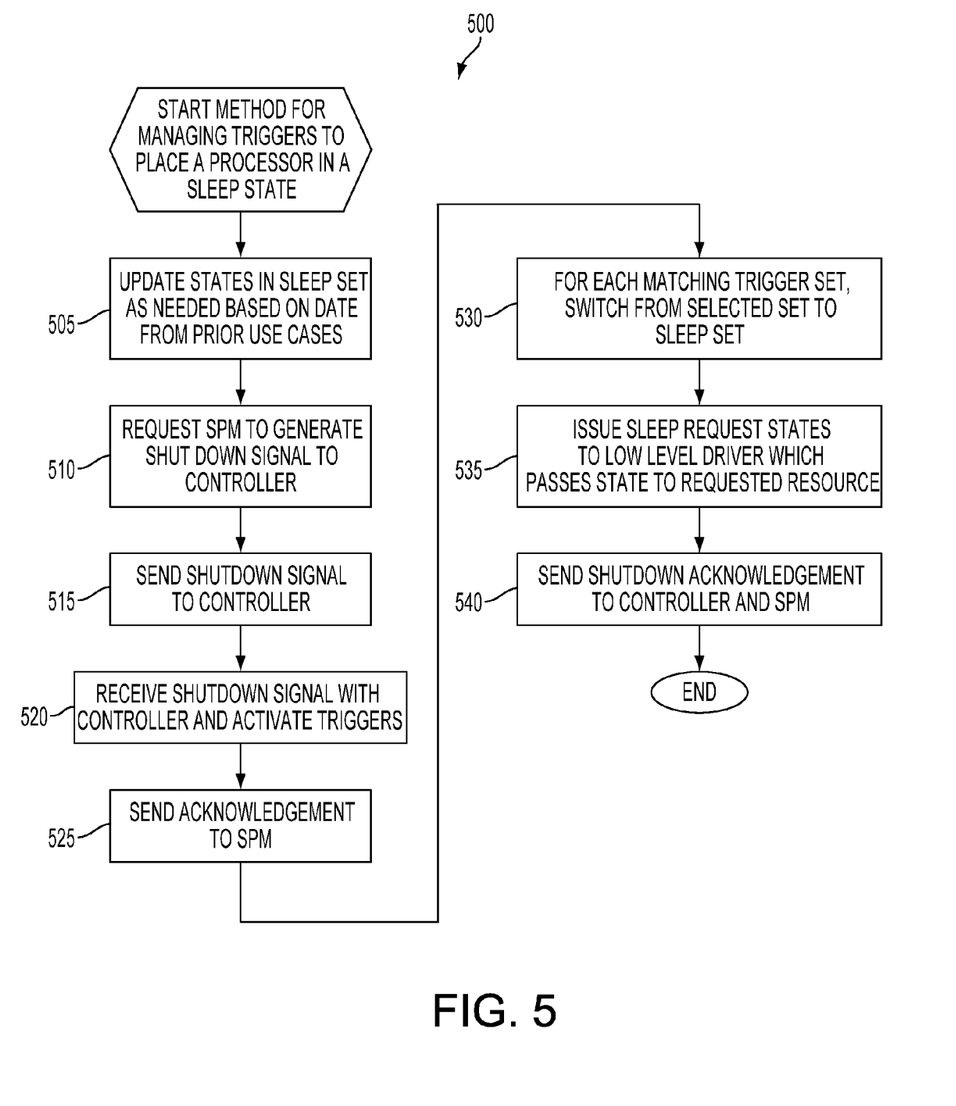
FIG. 5 is a logical flowchart illustrating a method for managing trigger sets to place a processor into a sleep state.

FIG. 5 is a logical flowchart illustrating a method 500 for managing trigger sets 314 to place a processor 110 into a sleep state. Block 505 is the first step of the method 500. In block 505, each processor 110 may update its resource sets 304 as well as its trigger sets 314 in the controller 101 as needed based on data from prior use cases of the PCD 100.

In block 510, a processor 110 may request the system power manager ("SPM") 157 to generate a shutdown signal to the controller 101. In block 515, the SPM 157 may send the shutdown signal to the controller 101.

The controller 101 may receive the shutdown signal in block 520 and activate the trigger sets 314 which may be assigned to a shutdown event as illustrated in FIG. 4. In the exemplary embodiment illustrated in FIG. 4, the shutdown signal is matched against the interrupt field 316 of the trigger set 314. The trigger set 314 directs the controller 101 to access a sleep set 308 as indicated in the "go to set" field 320. In block 525, the controller 101 may immediately send an acknowledgment signal to the SPM 157 while the controller 101 continues to activate resource sets 304 that are referenced by the trigger sets 314 which match the shutdown signal event.

In block 530, for each matching trigger set 314, such as the matching trigger set 314 listing the "shutdown" event in the corresponding interrupt field 316 illustrated in FIG. 4, the controller 101 may switch the current resource set 304 to a sleep set 308, such as the sleep set 308A of the first resource set 304A for the master processor 110A of FIG. 3.

Next, in block 535, the controller 101 may issue sleep request states to low-level drivers 103 such as illustrated in FIG. 2. The low-level drivers 103 may pass the requested states to the corresponding resources 105.

In block 540, each resource 105 may issue a shutdown signal acknowledgment to the controller 101 and the SPM 157. The method 500 may then end.

Figure 6:
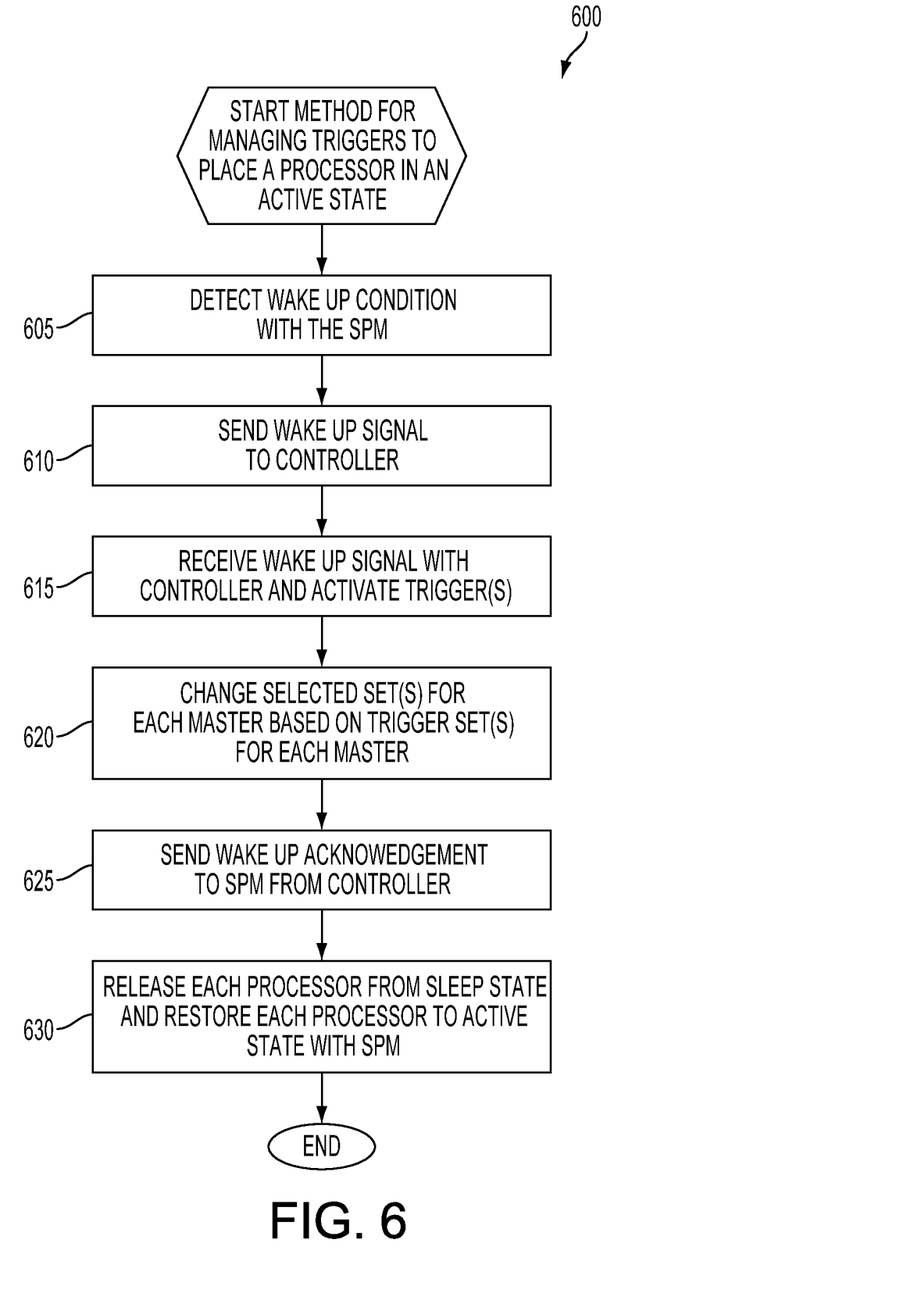
FIG. 6 is a logical flowchart illustrating a method for managing triggers sets to place a processor in an active state from a sleep state.

FIG. 6 is a logical flowchart illustrating a method 600 for managing trigger sets 314 to place a processor 110 in an active state from a sleep state. Block 605 is the first step in method 600. In block 605, a wake-up condition or wake-up event is detected with the SPM 157 or the wake-up event is detected directly by the controller 101 which may have its own interrupt controller (not illustrated). Exemplary embodiments may be designed such that wakeup interrupts may not be detectable by the SPM 157. In such exemplary embodiments, the controller 101 may use its interrupt controller to detect them and have these "mapped" to sleep set requirements for a master processor 110.

Next, in block 610 the SPM 157 may send a wake-up signal to the controller 101. In block 615, the controller 101 may receive the wake-up signal from the SPM 157 and activate one or more trigger sets 314 that matched the wake-up signal. For example, the controller 101 may match the wake-up signal with the "bring up" event listed in the interrupt field 316 in the "active" column of the trigger set 314 of FIG. 4. In the exemplary embodiment of FIG. 4, the "go to set field" 320 in the active column 324 directs the controller to the last resource set 304 which was used by the current processor 110.

So in block 620, the controller 101 would change the current resource set 304 for a processor 110 based on this matching trigger set 314. One of ordinary skill in the art recognizes that the controller 101 will cycle through all of its trigger sets that it maintains as illustrated in FIG. 3.

Next, in block 625, the controller 101 may send a wake-up acknowledgment to the SPM 157 identifying which master processors 110 have been awakened from the sleep state. Next, in block 630, each processor 110 with a matching wake up trigger set 314 is released from a sleep state and restored to its active state with power supplied by the SPM 157. The method 600 then ends.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the disclosed system and method. In some instances, certain steps may be omitted or not performed without departing from the method as understood by one of ordinary skill in the art. Further, words such as "thereafter", "then", "next", etc. are not intended to limit the order of the steps. These words are simply used to guide the reader through the description of the exemplary method.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGs. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for managing sleep states of a portable computing device comprising:
   maintaining a plurality of sets of resource states in memory for a plurality of processors, each of the plurality of sets of resource states comprising:
   a sleep set of resource states,
   an active set of resource states, and
   an additional set of resource states,
   each of the sleep set, active set and additional set including combinations of resource states that are associated with values in trigger sets assigned to each of the plurality of processors of the portable computing device,
   wherein a first sleep set of resource states defines states of resources of a first processor of the plurality of processors of the portable computing device when the first processor is in a sleep state, wherein a first active set of resource states defines states of resources of the first processor of the portable computing device when the first processor is active, and wherein a first additional set of resource states defines states of resources of the first processor when an interrupt is received by the first processor;
   updating the first sleep set, the first active set, and the first additional set based on prior usage of the portable computing device;
   issuing a request for the first processor to enter a sleep state;
   reviewing a first trigger set assigned to the first processor to determine if a shut down signal associated with the sleep state request for the first processor matches one or more values listed in the first trigger set; and
   if a trigger set value matches the shut down signal, then switching states of one or more resources in accordance with a combination of resource states associated with the trigger set value in the first sleep set.

2. The method of claim 1, further comprising generating an acknowledgement that the request for the first processor to enter the sleep state has been received.

3. The method of claim 1, wherein the active set of resource states and sleep set of resource states are different from one another.

4. The method of claim 1, wherein the reviewing the first trigger set to determine if shut down conditions for the first processor have been met is performed by a controller.

5. The method of claim 4, wherein the controller comprises at least one of software and hardware.

6. The method of claim 1, wherein each trigger set comprises at least one of an interrupt field, a from set field, a go to set field, a trigger start field, a clear field, and a timer field.

7. The method of claim 1, wherein an active set, sleep set, and additional set for a second processor of the portable computing device (PCD) is different than the active set, sleep set, and additional set for the first processor of the PCD.

8. The method of claim 7, wherein a second trigger set assigned to a second processor of the PCD is different than the first trigger set assigned to the first processor of the PCD.

9. The method of claim 1, further comprising: reviewing a second trigger set assigned to the first processor to determine if a wake-up condition for the first processor matches one or more conditions listed in the second trigger set; and if the second trigger set matches a wake-up condition, then switching states of one or more resources in accordance with the active set.

10. The method of claim 1, wherein the portable computing device comprises at least one of a cellular telephone, a satellite telephone, a pager, a PDA, a smartphone, a navigation device, a smartbook or reader, a media player, and a laptop computer with a wireless connection.

11. A computer system for managing sleep states of a portable computing device, the system comprising:
   a processor operable for:
      maintaining a plurality of sets of resource states in memory for each of a plurality of processors, each of the plurality of sets of resource states comprising:
      a sleep set of resource states,
      an active set of resource states, and
      an additional set of resource states,
      each of the sleep set, active set and additional set including combinations of resource states that are associated with values in trigger sets assigned to each of the plurality of processors of the portable computing device,
   wherein a first sleep set of resource states defines states of resources of a first processor of the plurality of processors of the portable computing device when the first processor is in a sleep state, wherein a first active set of resource states defines states of resources of the first processor of the portable computing device when the first processor is active, and wherein a first additional set of resource states defines states of resources of the first processor when an interrupt is received by the first processor;
   updating the first sleep set, the first active set, and the first additional set based on prior usage of the portable computing device;
   issuing a request for the first processor to enter a sleep state;
   reviewing a first trigger set assigned to the first processor to determine if a shut down signal associated with the sleep state request for the first processor matches one or more values listed in the first trigger set; and
   if a trigger set value matches the shut down signal, then switching states of one or more resources in accordance with a combination of resource states associated with the trigger set value in the first sleep set.

12. The system of claim 11, wherein the processor is further operable for generating an acknowledgement that the request for the first processor to enter the sleep state has been received.

13. The system of claim 11, wherein the active set of resource states and sleep set of resource states are different from one another.

14. The system of claim 11, wherein the processor operable for reviewing the first trigger set to determine if shut down conditions for the first processor have been met is performed by a controller.

15. The system of claim 14, wherein the controller comprises at least one of software and hardware.

16. The system of claim 11, wherein each trigger set comprises at least one of an interrupt field, a from set field, a go to set field, a trigger start field, a clear field, and a timer field.

17. The system of claim 11, wherein the processor is further operable for maintaining an active set, sleep set, and additional set for a second processor of the portable computing device (PCD) that is different than the active set, sleep set, and additional set for the first processor of the PCD.

18. The system of claim 17, wherein the processor is further operable for maintaining at least one second trigger set assigned to a second processor of the PCD that is different than the first trigger set assigned to the first processor of the PCD.

19. The system of claim 11, wherein the processor is further operable for: reviewing a second trigger set assigned to the first processor to determine if a wake-up condition for the first processor matches one or more conditions listed in the second trigger set; and if the second trigger set matches a wake-up condition, then switching states of one or more resources in accordance with the active set.

20. The system of claim 11, wherein the portable computing device comprises at least one of a mobile telephone, a personal digital assistant, a pager, a smartphone, a navigation device, and a hand-held computer with a wireless connection or link.

21. A computer system for managing sleep states of a portable computing device, the system comprising:
  means for maintaining a plurality of sets of resource states in memory for each of a plurality of processors, each of the plurality of sets of resource states comprising:
    a sleep set of resource states,
    an active set of resource states, and
    an additional set of resource states,
    each of the sleep set, active set and additional set including combinations of resource states that are associated with values in trigger sets assigned to each of the plurality of processors of the portable computing device,
  wherein a first sleep set of resource states defines states of resources of a first processor of the plurality of processors of the portable computing device when the first processor is in a sleep state, wherein a first active set of resource states defines states of resources of the first processor of the portable computing device when the first processor is active, and wherein a first additional set of resource states defines states of resources of the first processor when an interrupt is received by the first processor;
  means for updating the first sleep set, the first active set, and the first additional set based on prior usage of the portable computing device;
  means for issuing a request for the first processor to enter a sleep state;
  means for reviewing a first trigger set assigned to the first processor to determine if a shut down signal associated with the sleep state request for the first processor matches one or more values listed in the first trigger set; and
  means for switching states of one or more resources in accordance with a combination of resource states associated with the trigger set value in the first sleep set if a trigger set value matches the shut down signal.

22. The system of claim 21, further comprising: means for generating an acknowledgement that the request for the first processor to enter the sleep state has been received.

23. The system of claim 21, wherein the active set of resource states and sleep set of resource states are different from one another.

24. The system of claim 21, wherein the means for reviewing the first trigger set to determine if shut down conditions for the first processor have been met comprises a controller.

25. The system of claim 24, wherein the controller comprises at least one of software and hardware.

26. The method of claim 21, wherein each trigger set comprises at least one of an interrupt field, a from set field, a go to set field, a trigger start field, a clear field, and a timer field.

27. The system of claim 21, further comprising: means for maintaining an active set, sleep set, and additional set for a second processor of the portable computing device (PCD) is different than the active set, sleep set, and additional set for the first processor of the PCD.

28. The system of claim 21, further comprising: means for maintaining at least one second trigger set assigned to a second processor of the PCD that is different than the first trigger set assigned to the first processor of the PCD.

29. The system of claim 21, further comprising: means for reviewing a second trigger set assigned to the first processor to determine if a wake-up condition for the first processor matches one or more conditions listed in the second trigger set; and means for switching states of one or more resources in accordance with the active set if the second trigger set matches a wake-up condition.

30. The system of claim 21, wherein the portable computing device comprises at least one of a mobile telephone, a personal digital assistant, a pager, a smartphone, a navigation device, and a hand-held computer with a wireless connection or link.

31. A computer program product comprising a non-transitory computer usable medium having a computer readable program code embodied therein, said computer readable program code adapted to be executed to implement a method for managing sleep states of a portable computing device, said method comprising:
  maintaining a plurality of sets of resource states in memory for each of a plurality of processors, each of the plurality of sets of resource states comprising:
    a sleep set of resource state,
    an active set of resource states, and
    an additional set of resource states,
    each of the sleep set, active set and additional set including combinations of resource states that are associated with values in trigger sets assigned to each of the plurality of processors of the portable computing device,
  wherein a first sleep set of resource states defines states of resources of a first processor of the plurality of processors of the portable computing device when the first processor is in a sleep state, wherein a first active set of resource states defines states of resources of the first processor of the portable computing device when the first processor is active, and wherein a first additional set of resource states defines states of resources of the first processor when an interrupt is received by the first processor;
  updating the first sleep set, the first active set, and the first additional set based on prior usage of the portable computing device;
  issuing a request for the first processor to enter a sleep state;
  reviewing a first trigger set assigned to the first processor to determine if a shut down signal associated with the sleep state request for the first processor matches one or more values listed in the first trigger set; and
  if a trigger set value matches the shut down signal, then switching states of one or more resources in accordance with a combination of resource states associated with the trigger set value in the first sleep set.

32. The computer program product of claim 31, wherein the program code implementing the method further comprises: generating an acknowledgement that the request for the first processor to enter the sleep state has been received.

33. The computer program product of claim 31, wherein active set of resource states and sleep set of resource states are different from one another.

34. The computer program product of claim 31, wherein the reviewing the first trigger set to determine if shut down conditions for the first processor have been met is performed by a controller.

35. The computer program product of claim 34, wherein the controller comprises at least one of software and hardware.

36. The computer program product of claim 31, wherein each trigger set comprises at least one of an interrupt field, a from set field, a go to set field, a trigger start field, a clear field, and a timer field.

37. The computer program product of claim 31, wherein the program code implementing the method further comprises: maintaining an active set, sleep set, and additional set for a second processor of the portable computing device (PCD) that is different than the active set, sleep set, and additional set for the first processor of the PCD.

38. The computer program product of claim 31, wherein the program code implementing the method further comprises: maintaining at least one second trigger set assigned to a second processor of the PCD that is different than the first trigger set assigned to the first processor of the PCD.

39. The computer program product of claim 31, wherein the program code implementing the method further comprises: reviewing a second trigger set assigned to the first processor to determine if a wake-up condition for the first processor matches one or more conditions listed in the second trigger set; and if the second trigger set matches a wake-up condition, then switching states of one or more resources in accordance with the active set.

40. The computer program product of claim 31, wherein the portable computing device comprises at least one of a mobile telephone, a personal digital assistant, a pager, a smartphone, a navigation device, and a hand-held computer with a wireless connection or link.

* * * * *